(12) United States Patent
Coyle et al.

(10) Patent No.: US 11,824,591 B2
(45) Date of Patent: Nov. 21, 2023

(54) SYSTEMS AND METHODS FOR DETERMINING RADIO ACCESS NETWORK ANTENNA POOR PERFORMANCE SUBSCRIBER IMPACT

(71) Applicant: Verizon Patent and Licensing Inc., Basking Ridge, NJ (US)

(72) Inventors: Timothy E. Coyle, Chicopee, MA (US); Jason A. Birr, Lithia, FL (US); Matthew Kapala, North Billerica, MA (US); Hector Alejandro Garcia Crespo, North Richland Hills, TX (US); Brian A. Ward, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/655,452

(22) Filed: Mar. 18, 2022

(65) Prior Publication Data
US 2023/0299858 A1  Sep. 21, 2023

(51) Int. Cl.
*H04B 17/10* (2015.01)
*H04L 41/0604* (2022.01)
*H04W 24/04* (2009.01)
*H04W 16/18* (2009.01)

(52) U.S. Cl.
CPC ....... *H04B 17/102* (2015.01); *H04L 41/0613* (2013.01); *H04W 16/18* (2013.01); *H04W 24/04* (2013.01)

(58) Field of Classification Search
CPC .. H04B 17/102; H04L 41/0613; H04W 24/04; H04W 16/18
See application file for complete search history.

(56) References Cited

U.S. PATENT DOCUMENTS 11,050,475 B1 *  6/2021  Singh ..................... H01Q 3/005

\* cited by examiner

*Primary Examiner* — Brenda H Pham

(57) ABSTRACT

A device may receive antenna alert data associated with antennas of a plurality of base stations of a network, and may process the antenna alert data, with a correlation model, to generate a correlation heatmap matrix. The device may utilize a change point detection model to process the antenna alert data, associated with the correlation heatmap matrix, to determine change point metrics, and may calculate scores for the antenna alert data associated with the correlation heatmap matrix and the change point metrics. The device may perform one or more corrective actions based on the scores.

20 Claims, 10 Drawing Sheets

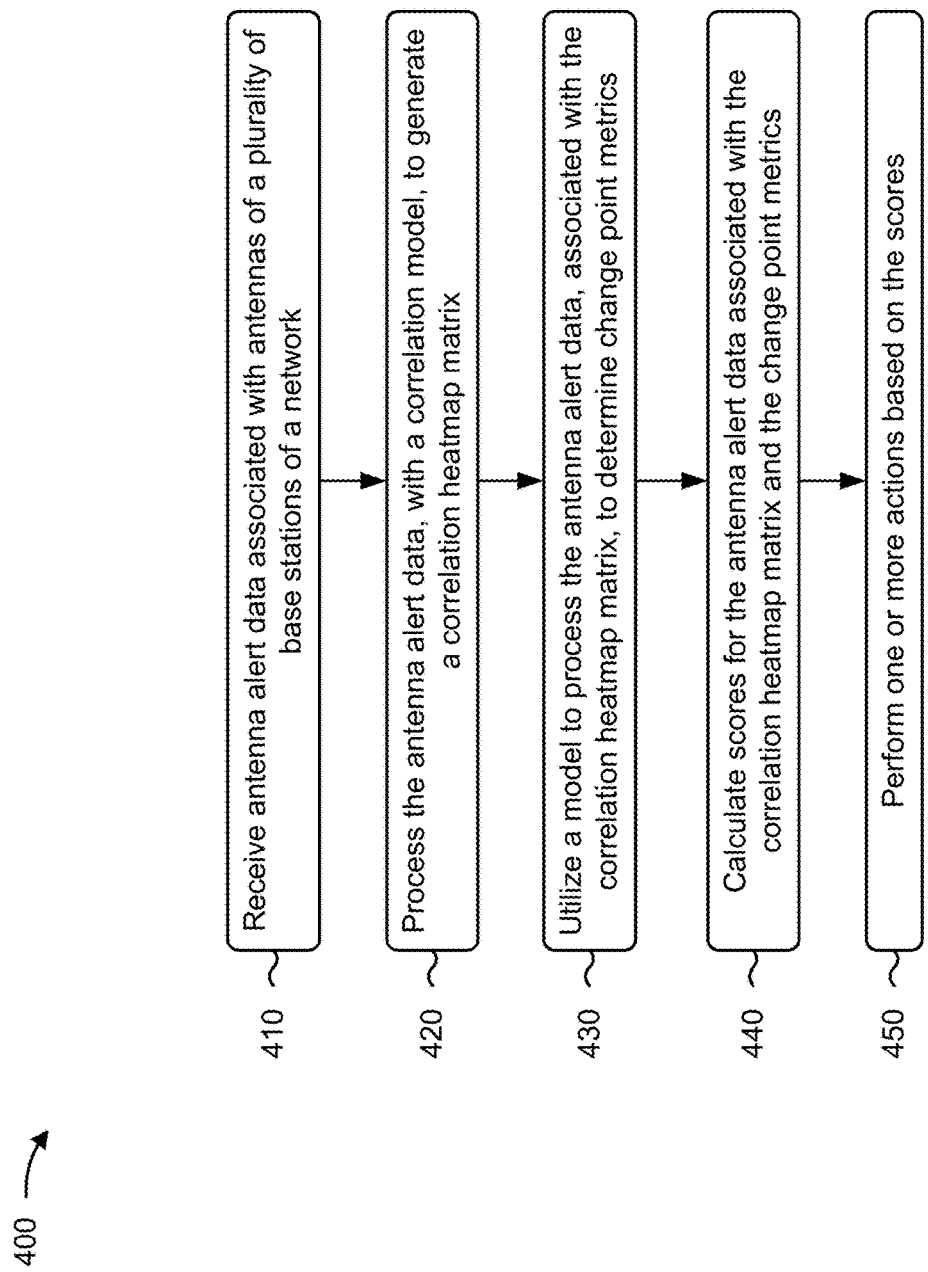

SYSTEMS AND METHODS FOR DETERMINING RADIO ACCESS NETWORK ANTENNA POOR PERFORMANCE SUBSCRIBER IMPACT

BACKGROUND

A base station may include one or more antennas that transmit and receive radio waves for a radio access network (RAN).

BRIEF DESCRIPTION OF THE DRAWINGS

FIG. 4 is a flowchart of an example process for determining RAN antenna performance impact.

DETAILED DESCRIPTION OF EXAMPLE EMBODIMENTS

Figure 1A:
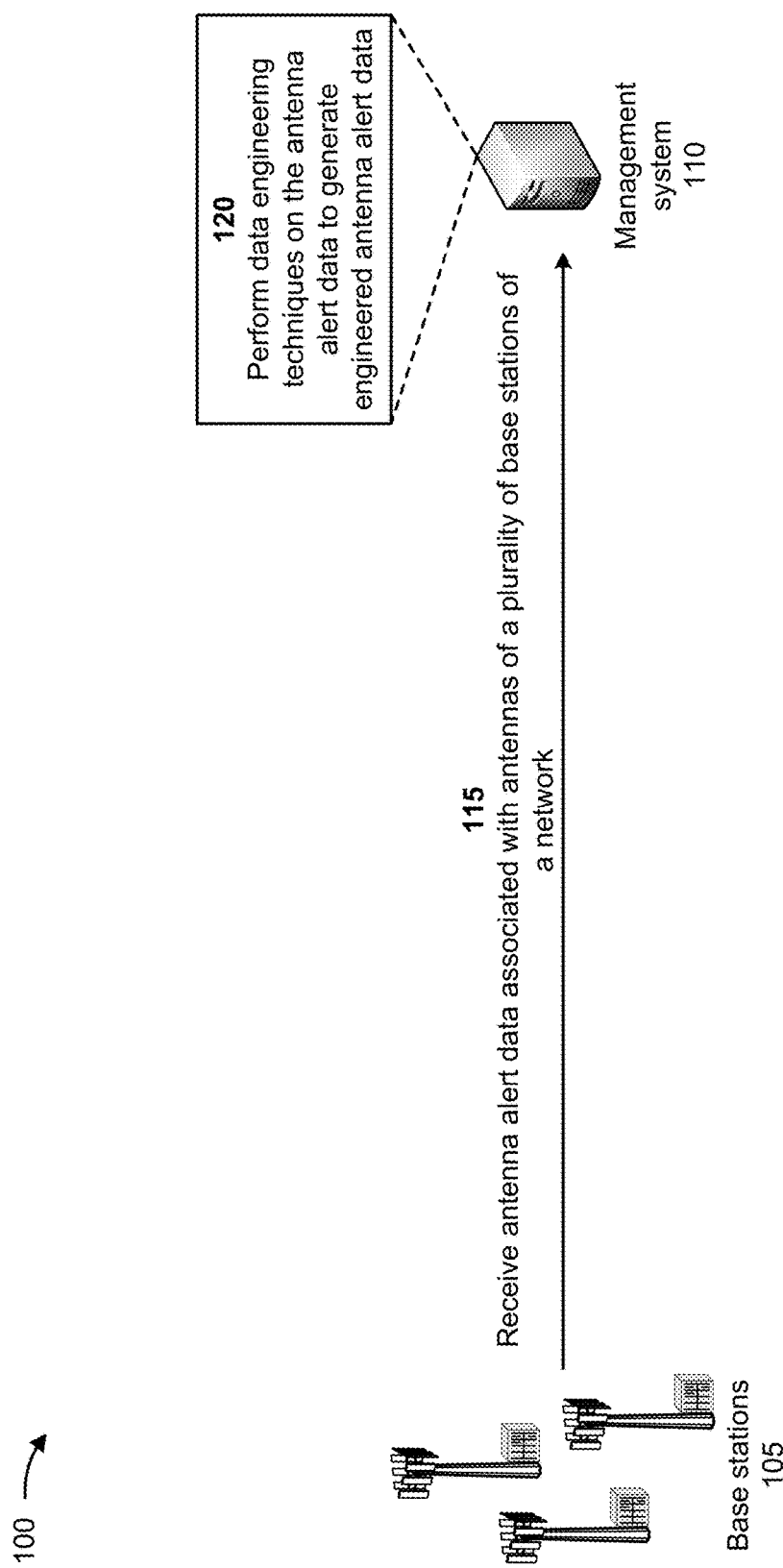
FIGS. 1A-1G are diagrams of an example associated with determining RAN antenna performance impact.

The following detailed description of example implementations refers to the accompanying drawings. The same reference numbers in different drawings may identify the same or similar elements.

Current systems for monitoring health of antennas of base stations generate excessive false positive antenna alerts daily since the current systems use a simple static threshold on a quantity (e.g., five, six, seven, and/or the like) of key performance indicators (KPIs) to approximate customer impact (e.g., impact on user equipment (UEs)). The excessive quantity of false positive antenna alerts obscures actual problems with the antennas of the base stations. Such false positive antenna alerts are not truly associated with severe problems and technicians waste time and resources investigating the false positive antenna alerts. Thus, current systems for monitoring health of antennas of base stations consume computing resources (e.g., processing resources, memory resources, communication resources, and/or the like), networking resources, and/or other resources associated with dispatching technicians to unsuccessfully investigate false positive antenna alerts, providing poor customer experience since actual antenna issues are not timely addressed by technicians, handling lost data caused by the actual antenna issues, and/or the like.

Some implementations described herein provide a management system that determines RAN antenna performance impact. For example, the management system may receive antenna alert data associated with antennas of a plurality of base stations of a network, and may process the antenna alert data, with a correlation model, to generate a correlation heatmap matrix. The management system may utilize a change point detection model to process the antenna alert data, associated with the correlation heatmap matrix, to determine change point metrics, and may calculate scores for the antenna alert data associated with the correlation heatmap matrix and the change point metrics. The management system may perform one or more corrective actions based on the scores.

In this way, the management system determines RAN antenna performance impact. For example, the management system may generate correlated customer impact scores associated with known antenna problems within a cellular network of base stations. The management system may combine time-shifted correlation computations with change-point detection, and may perform scoring to generate customer impact scores caused by the antenna problems. The management system may also mitigate poor performance spikes that are not typically related to ongoing antenna problems. Thus, the management system may conserve computing resources, networking resources, and/or other resources that would have otherwise been consumed by dispatching technicians to unsuccessfully investigate false positive antenna alerts, providing poor customer experience since actual antenna issues are not timely addressed by technicians, handling lost data caused by the actual antenna issues, and/or the like.

FIGS. 1A-1G are diagrams of an example 100 associated with determining RAN antenna performance impact. As shown in FIGS. 1A-1G, example 100 includes a plurality of base stations 105 associated with a management system 110. Further details of the base stations 105 and the management system 110 are provided elsewhere herein.

As shown in FIG. 1A, and by reference number 115, the management system 110 may receive antenna alert data associated with antennas of the plurality of base stations 105 of a network. For example, each base station 105 may include one or more antennas that transmit and receive radio waves for a RAN. Signaling may be provided between the antennas of the base stations 105 and UEs of the RAN (e.g., over a period of time). Measurements may be calculated by performance counters associated with the base stations 105 and/or the UEs. The measurements may include events (e.g., connections, traffic transmission, traffic reception, and/or the like) recorded by the performance counters associated with the base stations 105 and/or the UEs. KPIs may be calculated based on the measurements (e.g., the recorded events). The KPIs may include bandwidths, throughputs, signal strengths, indications of service availability (e.g., percentages of time that the base stations 105 are providing services to the UEs), indications of network resources (e.g., traffic and control channels provided by the base stations 105), indications of handovers (e.g., a handover of a moving UE from one base station 105 to another base station 105), voice service indicators, data service indicators, and/or the like.

In some implementations, the management system 110 may receive the measurements and/or the signaling from the base stations 105 and/or the UEs, and may calculate the KPIs based on the measurements and/or the signaling. In some implementations, the base stations 105 may calculate the KPIs based on the measurements and/or the signaling, and may provide the KPIs to the management system 110. The base stations 105 may generate the antenna alert data when one or more of the KPIs fail to satisfy thresholds indicating potential problems with the antennas of the base stations 105. The antenna alert data may include an identifier associated with a market (e.g., the RAN) provided by the base stations 105, identifiers (e.g., cell identifiers) associated with the base stations 105 generating antenna alerts, historical alert data (e.g., antenna alerts for the base stations 105 for a historical time period), data identifying an end date of the historical alert data, a quantity of days to include in the historical alert data (e.g., thirty days), and/or the like.

The base stations 105 may provide the antenna alert data to the management system 110, and the management system 110 may receive the antenna alert data. The management system 110 may periodically receive the antenna alert data from the base stations 105, may continuously receive the antenna alert data from the base stations 105, may receive the antenna alert data based on providing a request for the antenna alert data to the base stations 105, and/or the like. In some implementations, the management system 110 may generate the antenna alert data when one or more of the KPIs fail to satisfy thresholds indicating potential problems with the antennas of the base stations 105.

As further shown in FIG. 1A, and by reference number 120, the management system 110 may perform one or more data engineering techniques on the antenna alert data to generate engineered antenna alert data. For example, the management system 110 may perform a data cleansing technique on the antenna alert data to generate the engineered antenna alert data. The data cleansing technique may remove, from the antenna alert data, data that is constant over a time period in order to generate the engineered antenna alert data. In some implementations, the management system 110 may perform a feature engineering technique on the antenna alert data to generate the engineered antenna alert data. For example, the feature engineering technique may generate labels for the antenna alert data based on when antenna alerts occur (e.g., yesterday, two days ago, and/or the like) in order to generate the engineered antenna alert data. In some implementations, the management system 110 may perform a scaling technique on the antenna alert data to generate the engineered antenna alert data. For example, the scaling technique may normalize each KPI for each base station 105 included in the antenna alert data in order to generate the engineered antenna alert data.

Figure 1B:
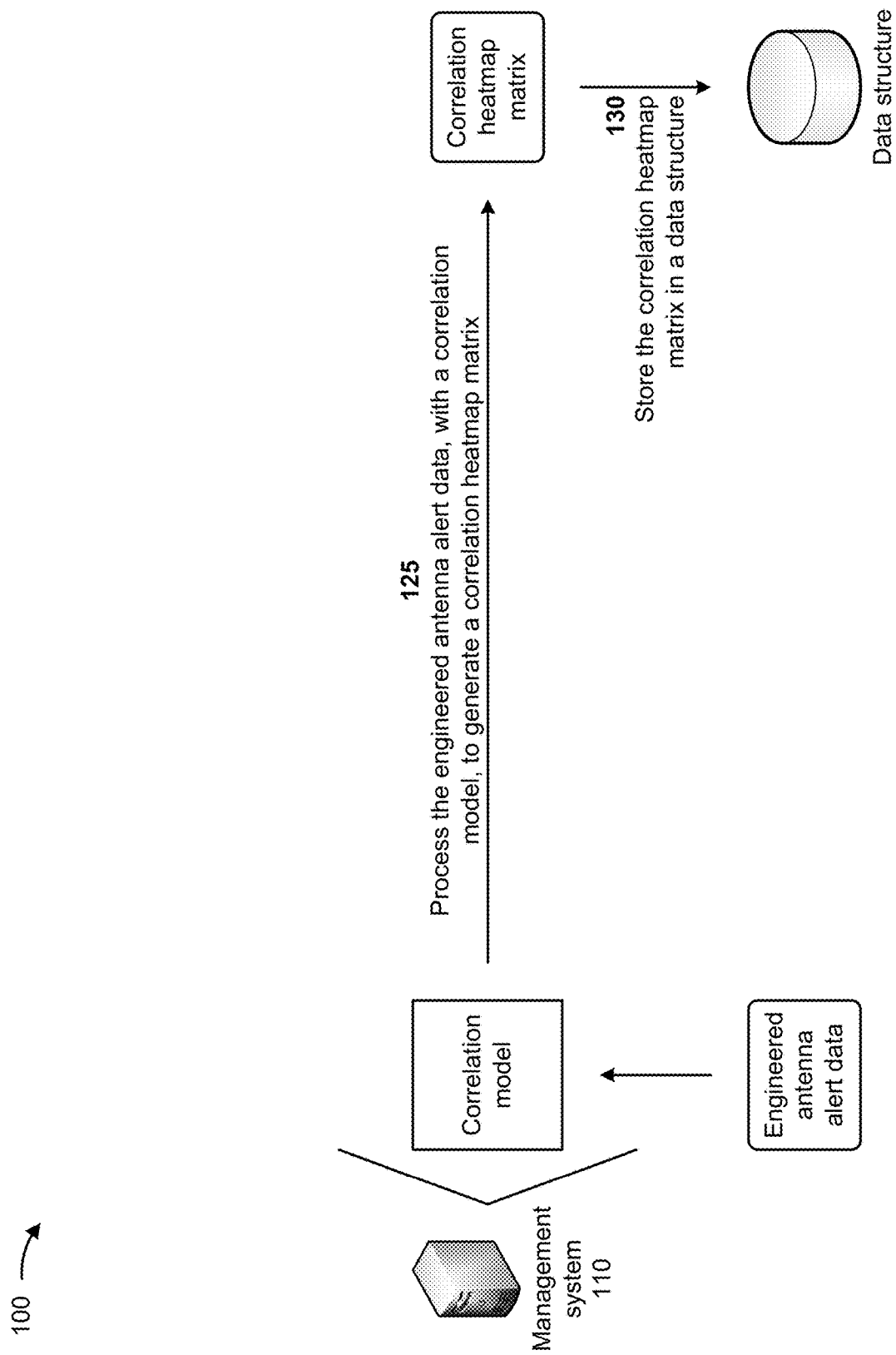

As shown in FIG. 1B, and by reference number 125, the management system 110 may process the engineered antenna alert data, with a correlation model, to generate a correlation heatmap matrix. For example, the management system 110 may process the antenna alert data (e.g., for each base station 105 and for each KPI per base station 105), with a correlation model to generate the correlation heatmap matrix. The correlation heatmap matrix may correlate each KPI to an antenna alert KPI in a time period. In some implementations, the correlation model may include a Pearson correlation model. The Pearson correlation model may assign, to each correlation, a value between negative one (−1) and one (1), where zero (0) indicates no correlation, one (1) indicates a total positive correlation, and negative one (−1) indicates a total negative correlation. The correlation model may utilize tuneable and highly correlated thresholds to determine correlations between KPIs of the antenna alert data. The correlation model may utilize tuneable business requirements to determine correlations for different KPI combinations. The correlation model may output the correlation heatmap matrix, described further below in connection with FIG. 1C.

As further shown in FIG. 1B, and by reference number 130, the management system 110 may store the correlation heatmap matrix in a data structure (e.g., a database, a table, a list, and/or the like) associated with the management system 110. For example, the correlation heatmap matrix may provide an indication of the correlation between each KPI and an antenna alert KPI in a time period. The correlation heatmap matrix may be associated with a portion of the engineered antenna alert data. A remaining portion of the engineered antenna alert data, not associated with the correlation heatmap matrix, may include data that the management system 110 may not utilize to identify true antenna alerts. Thus, the management system 110 may store the correlation heatmap matrix and the portion of the engineered antenna alert data, associated with the correlation heatmap matrix, in the data structure.

Figure 1C:
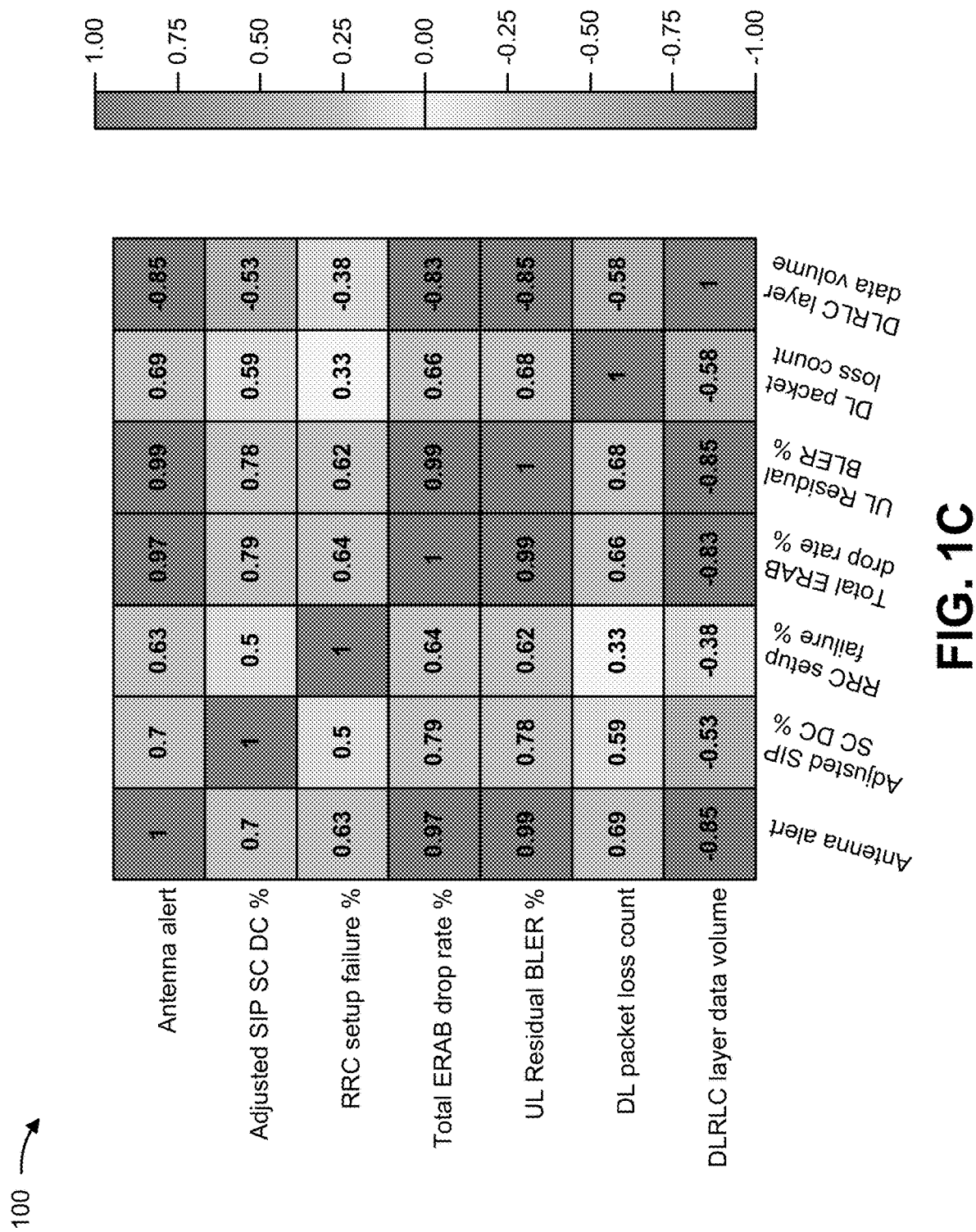

FIG. 1C depicts an example correlation heatmap matrix capable of being generated by the management system 110. As shown, the correlation heatmap matrix includes rows and corresponding columns for KPI data identifying antenna alerts, adjusted session initiation protocol (SIP) sector carrier (SC) dropped call (DC) percentages, radio resource control (RRC) setup failure percentages, total E-UTRAN radio access bearer (ERAB) drop rate percentages, uplink (UL) residual block error rate (BLER) percentages, downlink (DL) packet loss count, a downlink radio link control (DLRLC) layer data volume, and/or the like. Each block of the correlation heatmap matrix includes a value, ranging from negative one (−1) to one (1), that indicates a correlation between a corresponding row and column of each block. A value of zero (0) indicates no correlation between a corresponding row and column of each block, a value of one (1) in a block indicates a total positive correlation between a corresponding row and column of that block, and negative one (−1) in a block indicates a total negative correlation between a corresponding row and column of that block. In some implementations, the example correlation heatmap matrix may include more KPI data (e.g., more rows and columns), less KPI data (e.g., less rows and columns), different KPI data, different correlation values, and/or the like than that depicted in FIG. 1C.

Figure 1D:
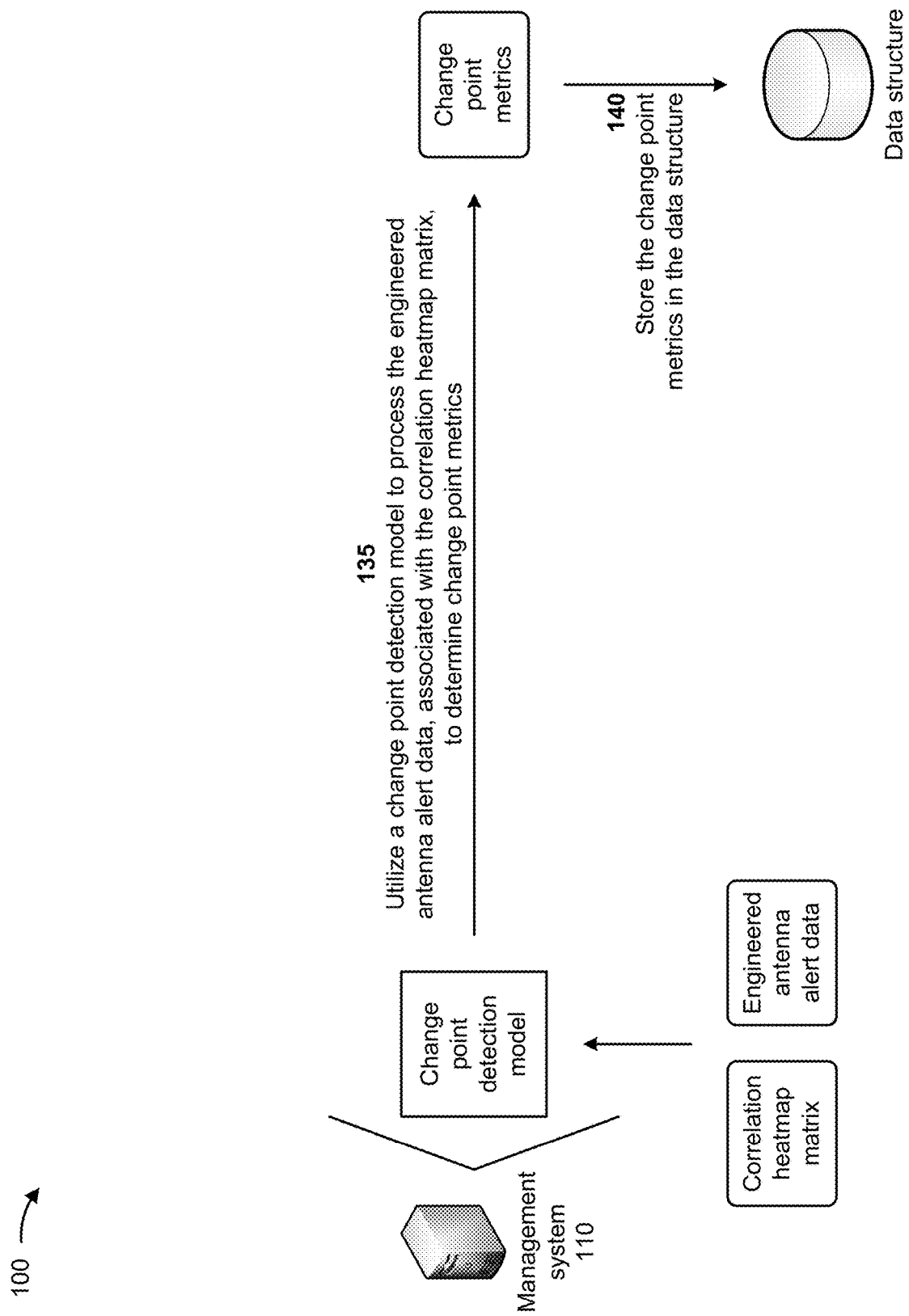

As shown in FIG. 1D, and by reference number 135, the management system 110 may utilize a change point detection model to process the engineered antenna alert data, associated with the correlation heatmap matrix, to determine change point metrics. For example, the management system 110 may utilize the change point detection model to process the portion of the engineered antenna alert data that is associated with the correlation heatmap matrix (e.g., the engineered antenna alert data that satisfies correlation requirements). The change point detection model may include a model that identifies a quantity of times when a probability distribution of a stochastic process or a time series changes and remains changed (e.g., does not spike). The change point detection model may be configurable and tunable to ignore spikes in the engineered antenna alert data associated with the correlation heatmap matrix. The change point metrics may include data identifying change points (e.g., where the engineered antenna alert data, associated with the correlation heatmap matrix, changes and remains changed), times associated with the change points, and/or the like. Further details of the change point metrics are described below in connection with FIG. 1E.

As further shown in FIG. 1D, and by reference number 140, the management system 110 may store the change point metrics in the data structure. For example, the change point metrics may provide an indication of continuous changes in the engineered antenna alert data associated with the correlation heatmap matrix. The change point metrics may be associated with a portion of the engineered antenna alert data that is associated with the correlation heatmap matrix. A remaining portion of the engineered antenna alert data, associated with the correlation heatmap matrix but not associated with the change point metrics, may include data that the management system 110 may not utilize to identify true antenna alerts. Thus, the management system 110 may store the change point metrics and the portion of the engineered antenna alert data, associated with the correlation heatmap matrix and the change point metrics, in the data structure.

Figure 1E:
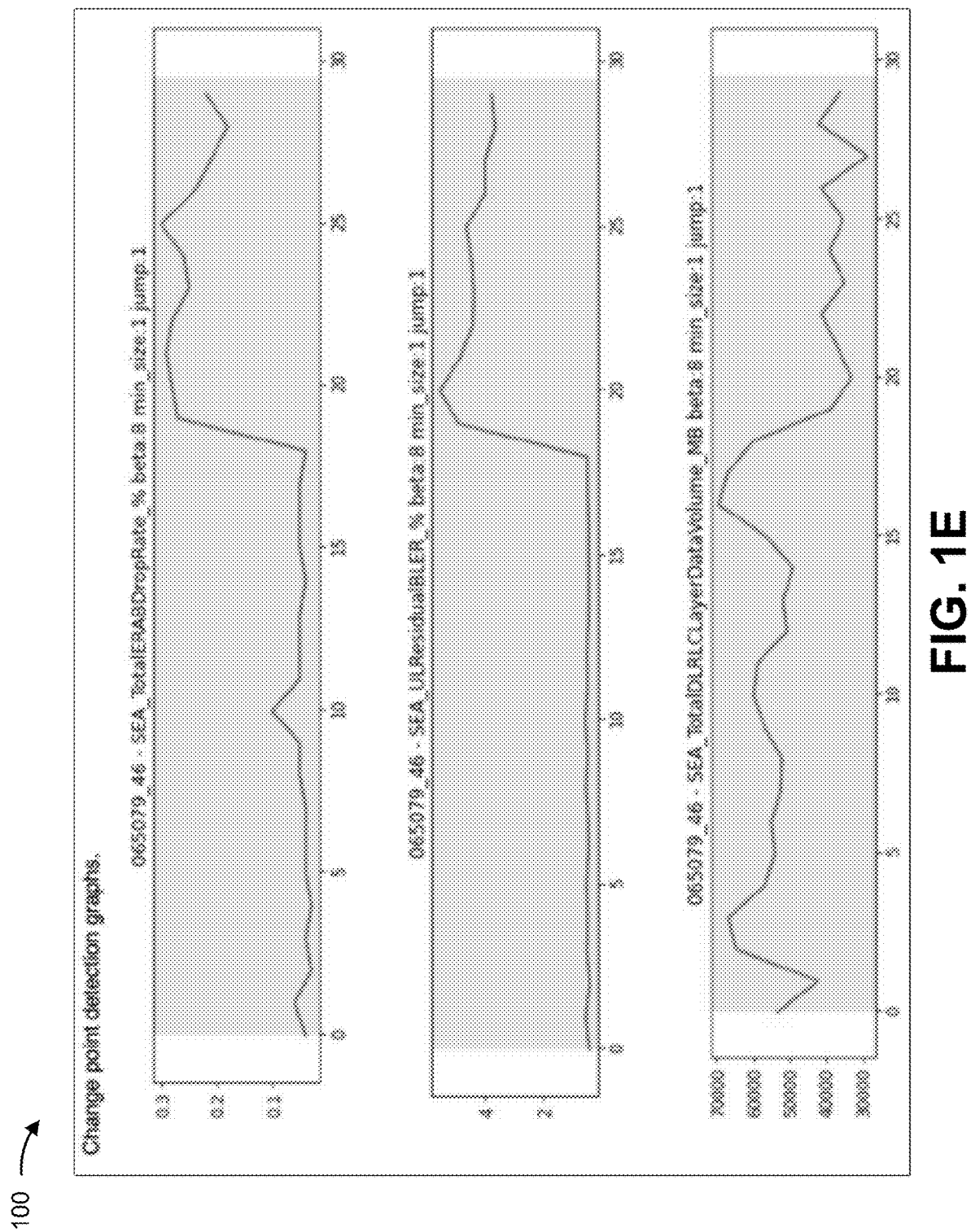

FIG. 1E depicts example change point metrics that may be generated by the management system 110. As shown, the change point metrics may be depicted as change point detection graphs. A change point detection graph such as the top change point detection graph of FIG. 1E may be associated with the total ERAB drop rate percentages and may indicate a change point (e.g., where data changes and remains changed) at a particular time (e.g., approximately day eighteen). A change point detection graph such as the middle change point detection graph of FIG. 1E may be associated with the UL residual BLER percentages and may indicate a change point at a particular time (e.g., approximately day eighteen). A change point detection graph such as the bottom change point detection graph of FIG. 1E may be associated with the DLRLC layer data volume and may indicate a change point at a particular time (e.g., approximately day eighteen).

Figure 1F:
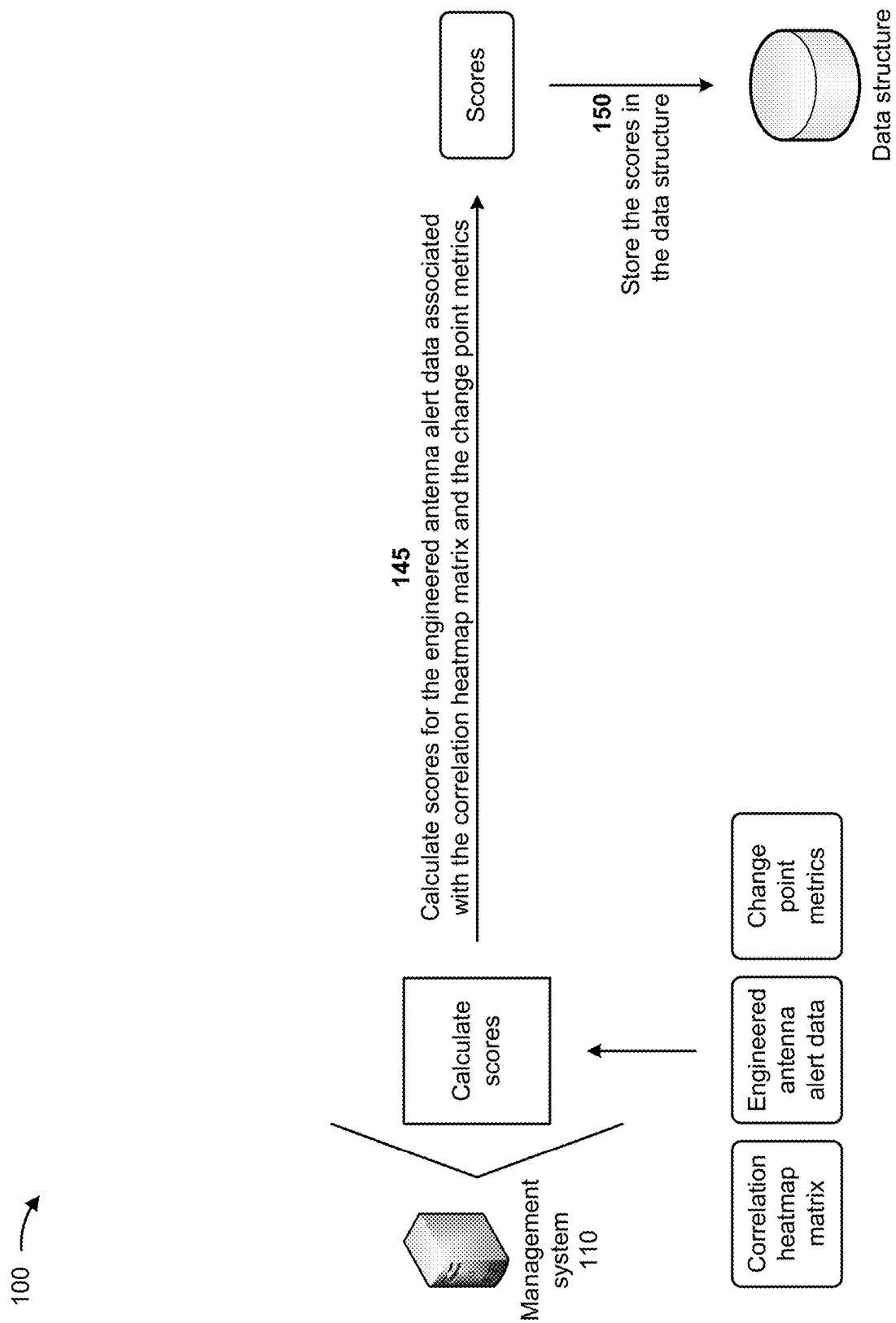

As shown in FIG. 1F, and by reference number 145, the management system 110 may calculate scores for the engineered antenna alert data associated with the correlation heatmap matrix and the change point metrics. For example, for the engineered antenna alert data associated with the correlation heatmap matrix and the change point metrics (e.g., the engineered antenna alert data satisfying correlation and change point requirements), the management system 110 may calculate standard scores. A standard score or a "z score" may indicate a quantity of standard deviations by which a value of a raw score (e.g., an observed value or data point) is above or below a mean value of what is being observed or measured. In some implementations, the management system 110 may utilize tuneable business thresholds when calculating the standard scores for the engineered antenna alert data associated with the correlation heatmap matrix and the change point metrics.

As further shown in FIG. 1F, and by reference number 150, the management system 110 may store the scores in the data structure. For example, the scores may provide an indication of real issues associated with antennas of the base stations 105, rather than false positives. The management system 110 may store the scores and the portion of the engineered antenna alert data, associated with the correlation heatmap matrix and the change point metrics, in the data structure.

Figure 1G:
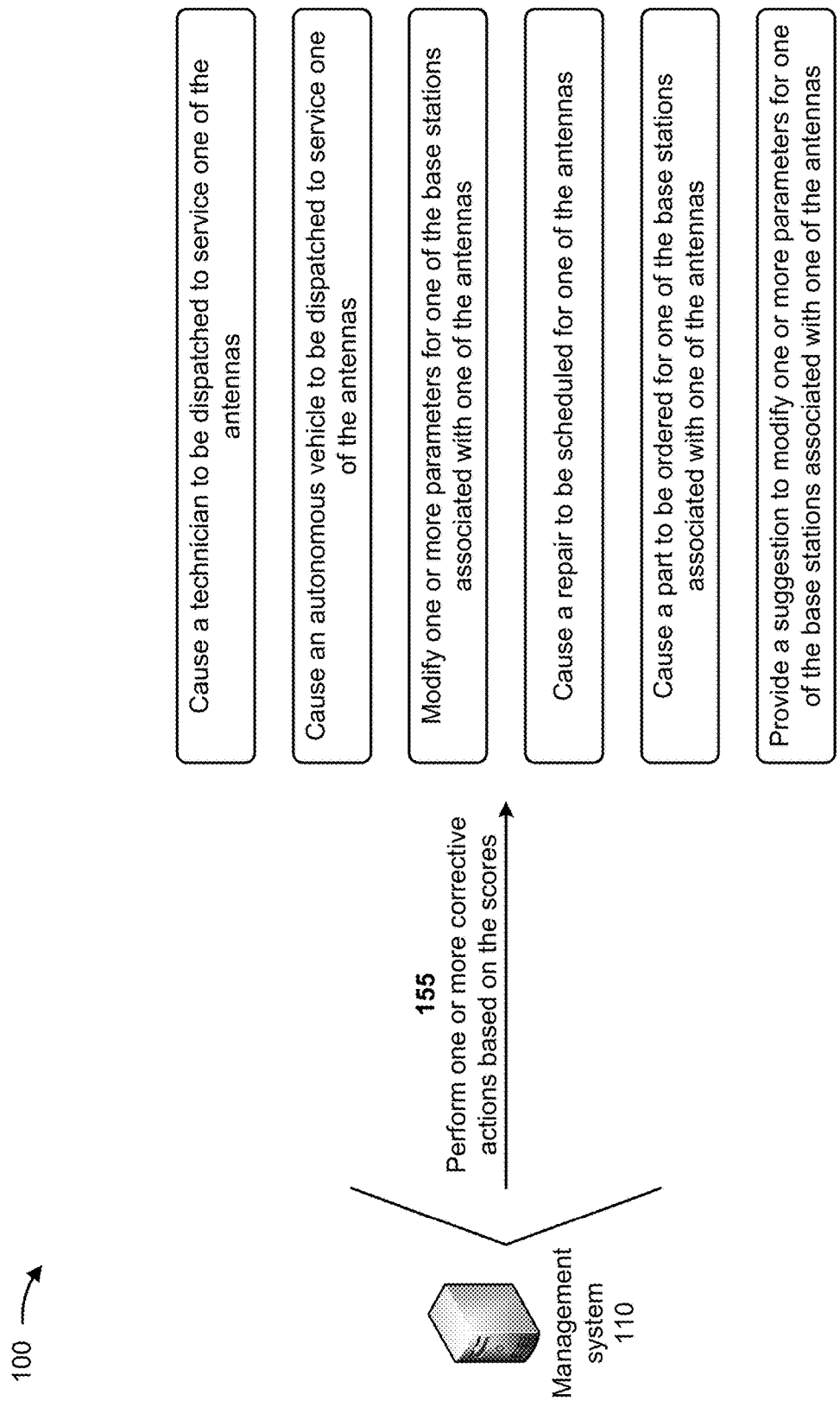

As shown in FIG. 1G, and by reference number 155, the management system 110 may perform one or more corrective actions based on the scores. In some implementations, performing the one or more corrective actions includes the management system 110 causing a technician to be dispatched to service one of the antennas. For example, the management system 110 may provide, to a technician (e.g., a UE of the technician), a notification identifying one of the antennas of one of the base stations 105. The technician may utilize the notification to travel to the antenna and attempt to correct the antenna. In this way, the management system 110 may conserve computing resources, networking resources, and/or other resources that would have otherwise been consumed by dispatching technicians to unsuccessfully investigate false positive antenna alerts.

In some implementations, performing the one or more corrective actions includes the management system 110 causing an autonomous vehicle to be dispatched to service one of the antennas. For example, the management system 110 may provide, to an autonomous vehicle (e.g., a drone, a robot, and/or the like), instructions identifying one of the antennas of one of the base stations 105. The autonomous vehicle may utilize the instructions to travel to the antenna and attempt to correct the antenna. In this way, the management system 110 may conserve computing resources, networking resources, and/or other resources that would have otherwise been consumed by dispatching autonomous vehicles to unsuccessfully investigate false positive antenna alerts.

In some implementations, performing the one or more corrective actions includes the management system 110 modifying one or more parameters for one of the base stations 105 associated with one of the antennas. For example, the management system 110 may identify a base station 105 associated with an antenna experiencing a problem, and may determine parameters of the base station 105 to modify (e.g., adjust an antenna angle, increase antenna power, and/or the like) in order to correct the problem with the antenna. The management system 110 may instruct the base station 105 to modify the parameters in order to correct the problem with the antenna. In this way, the management system 110 may conserve computing resources, networking resources, and/or other resources that would have otherwise been consumed by handling lost data caused by the antenna experiencing the problem or handling false positive antenna alerts.

In some implementations, performing the one or more corrective actions includes the management system 110 causing a repair to be scheduled for one of the antennas of one of the base stations 105. For example, the management system 110 may schedule a technician or an autonomous vehicle to be dispatched to repair an antenna of a base station 105. The management system 110 may review availabilities of technicians or autonomous vehicles when scheduling the technician or the autonomous vehicle for repairing the antenna of the base station 105. In this way, the management system 110 may conserve computing resources, networking resources, and/or other resources that would have otherwise been consumed by handling issues associated with poor customer experience caused by the antenna to be repaired.

In some implementations, performing the one or more corrective actions includes the management system 110 causing a part to be ordered for one of the base stations 105 associated with one of the antennas. For example, the management system 110 may determine that a part of an antenna of a base station 105 needs to be replaced, and may order the part from a supplier of the part. The replacement part, when installed, may cause the antenna to correctly function. In this way, the management system 110 may conserve computing resources, networking resources, and/or other resources that would have otherwise been consumed by providing a poor customer experience while waiting for the new part for the antenna to be available and ready to replace the malfunctioning part.

In some implementations, performing the one or more corrective actions includes the management system 110 providing a suggestion to modify one of the parameters for one of the base stations 105 associated with one of the antennas. For example, the management system 110 may determine that a parameter (e.g., a tilt angle) associated with an antenna of a base station 105 is incorrect, and may determine a modification to the parameter. The management system 110 may provide a suggestion for the modification to a technician responsible for the base station 105. In this way, the management system 110 may conserve computing resources, networking resources, and/or other resources that would have otherwise been consumed by providing a poor customer experience to customers associated with the base station 105 that requires parameter modification.

In some implementations, the management system 110 may output priority levels for antenna alerts, correlation assessments, antenna settings, and/or the like based on the scores. The management system 110 may provide actionable corrections to antenna settings, and further information associated with significant changes in the antenna alert data. In some implementations, the management system 110 may generate and provide for display a report (e.g., during user acceptance testing) that includes the correlation heatmap matrix, the change point metrics, and/or the scores. The report may also include a plot of KPIs and antenna alerts over time. The change point metrics may indicate why an alert is significant to a customer and/or a technician, and may include graphs depicting KPIs with high correlations and high change point determinations.

In this way, the management system 110 determines RAN (e.g., the base station 105) antenna performance impact. For example, the management system 110 may generate correlated customer impact scores associated with known antenna problems within a cellular network of base stations. The management system 110 may combine time-shifted correlation computations with change-point detection, and may perform scoring to generate customer impact scores caused by the antenna problems. For example, the time-shifted correlation computations may include processing a time shift by correlating a signal with another signal that is moved by a quantity of elements to the right or left. The change-point detection may include utilizing a sliding window through a signal by walking through the signal with a window of fixed size. For each step, a function computes a chance of having a change point in a current window. The management system 110 may also mitigate poor performance spikes that are not typically related to ongoing antenna problems. Thus, the management system 110 may conserve computing resources, networking resources, and/or other resources that would have otherwise been consumed by dispatching technicians to unsuccessfully investigate false positive antenna alerts, providing poor customer experience since actual antenna issues are not timely addressed by technicians, handling lost data caused by the actual antenna issues, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
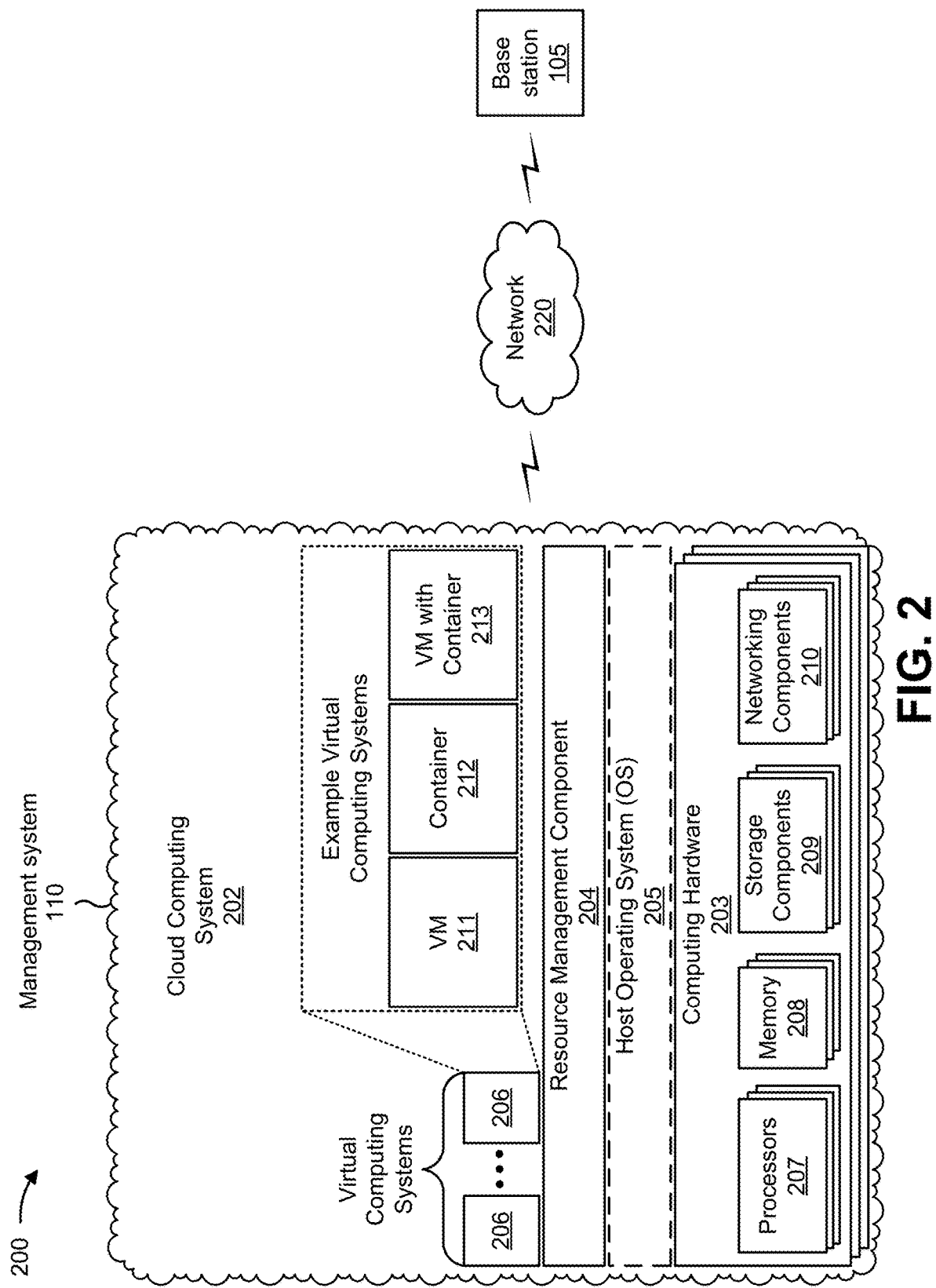
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the management system 110, which may include one or more elements of and/or may execute within a cloud computing system 202. The cloud computing system 202 may include one or more elements 203-213, as described in more detail below. As further shown in FIG. 2, the environment 200 may include the base station 105 and/or a network 220. Devices and/or elements of the environment 200 may interconnect via wired connections and/or wireless connections.

The base station 105 includes one or more devices capable of transferring traffic, such as audio, video, text, and/or other traffic, destined for and/or received from a UE. For example, the base station 105 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 105 may support, for example, a cellular radio access technology (RAT). The base station 105 may transfer traffic between a UE (e.g., using a cellular RAT), one or more other base stations 105 (e.g., using a wireless interface or a backhaul interface, such as a wired backhaul interface), and/or a core network. The base station 105 may provide one or more cells that cover geographic areas.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the management system 110 may include one or more elements 203-213 of the cloud computing system 202, may execute within the cloud computing system 202, and/or may be hosted within the cloud computing system 202, in some implementations, the management system 110 may not be cloud-based (e.g., may be implemented outside of a cloud computing system) or may be partially cloud-based. For example, the management system 110 may include one or more devices that are not part of the cloud computing system 202, such as the device 300 of FIG. 3, which may include a standalone server or another type of computing device. The management system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
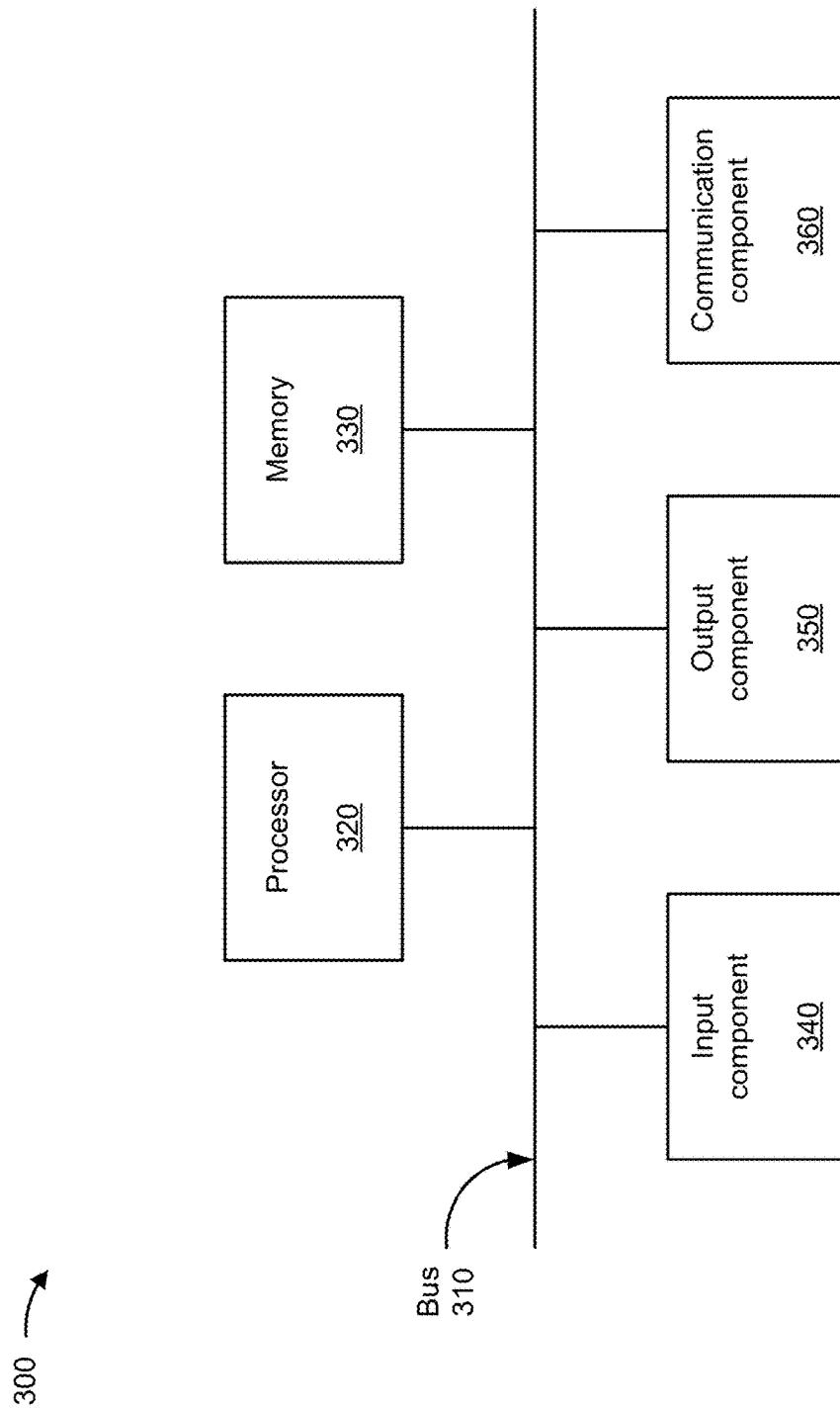
FIG. 3 is a diagram of example components of one or more devices of FIG. 2.

FIG. 3 is a diagram of example components of a device 300, which may correspond to the base station 105 and/or the management system 110. In some implementations, the base station 105 and/or the management system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for determining RAN antenna performance impact. In some implementations, one or more process blocks of FIG. 4 may be performed by a device (e.g., the management system 110). In some implementations, one or more process blocks of FIG. 4 may be performed by another device or a group of devices separate from or including the device, such as a base station (e.g., the base station 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving antenna alert data associated with antennas of a plurality of base stations of a network (block 410). For example, the device may receive antenna alert data associated with health and performance of antennas of a plurality of base stations of a network, as described above.

As further shown in FIG. 4, process 400 may include processing the antenna alert data, with a correlation model, to generate a correlation heatmap matrix (block 420). For example, the device may process the antenna alert data, with a correlation model, to generate a correlation heatmap matrix, as described above. In some implementations, the correlation heatmap matrix correlates key performance indicators with health and performance alerts in a particular time period. In some implementations, the correlation model is a Pearson correlation model. In some implementations, processing the antenna alert data, with the correlation model, to generate the correlation heatmap matrix includes correlating key performance indicators with the antenna alert data in a time period to generate the correlation heatmap matrix. The correlation heatmap matrix identifies a strong correlation between KPI changes and the health and performance alerts associated with antennas.

As further shown in FIG. 4, process 400 may include utilizing a change point detection model to process the antenna alert data, associated with the correlation heatmap matrix, to determine change point metrics (block 430). For example, the device may utilize a change point detection model to process the antenna alert data, associated with the correlation heatmap matrix, to determine change point metrics, as described above. In some implementations, the change point metrics identify, in the antenna alert data, data that changes and remains unchanged.

As further shown in FIG. 4, process 400 may include calculating scores for the antenna alert data associated with the correlation heatmap matrix and the change point metrics (block 440). For example, the device may calculate scores for the antenna alert data associated with the correlation heatmap matrix and the change point metrics, as described above. In some implementations, the scores are standard scores that indicate a quantity of standard deviations that data points lie above or below a mean value.

As further shown in FIG. 4, process 400 may include performing one or more corrective actions based on the scores (block 450). For example, the device may perform one or more corrective actions based on the scores, as described above. In some implementations, performing the one or more corrective actions includes one or more of causing a technician to be dispatched to service one of the antennas of one of the plurality of base stations, or causing an autonomous vehicle to be dispatched to service one of the antennas of one of the plurality of base stations. In some implementations, performing the one or more corrective actions includes identifying one of the plurality of base stations associated with an antenna experiencing a problem based on the scores, determining one or more parameters, associated with the one of the plurality of base stations, to modify in order to correct the problem with the antenna, and instructing the one of the plurality of base stations to modify the one or more parameters in order to correct the problem with the antenna.

In some implementations, performing the one or more corrective actions includes one or more of causing a repair to be scheduled for one of the antennas of one of the plurality of base stations based on the scores, or causing a part to be ordered for one of the plurality of base stations associated with one of the antennas based on the scores. In some implementations, performing the one or more corrective actions includes determining a suggestion to modify one or more parameters for one of the plurality of base stations associated with one of the antennas, based on the scores, and providing the suggestion for display.

In some implementations, process 400 includes performing one or more data engineering techniques on the antenna alert data to generate engineered antenna alert data. In some implementations, performing the one or more data engineering techniques on the antenna alert data includes performing a data cleansing technique on the antenna alert data to generate the engineered antenna alert data, performing a feature engineering technique on the antenna alert data to generate the engineered antenna alert data, or performing a scaling technique on the antenna alert data to generate the engineered antenna alert data.

In some implementations, process 400 includes storing one or more of the correlation heatmap matrix, the change point metrics, or the scores in a data structure associated with the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, antenna alert data associated with health and performance of antennas of a plurality of base stations of a network;
   processing, by the device, the antenna alert data, with a correlation model, to generate a correlation heatmap matrix;
   utilizing, by the device, a change point detection model to process the antenna alert data, associated with the correlation heatmap matrix, to determine change point metrics;
   calculating, by the device, scores for the antenna alert data associated with the correlation heatmap matrix and the change point metrics; and
   performing, by the device, one or more corrective actions based on the scores.

2. The method of claim 1, further comprising:
   performing one or more data engineering techniques on the antenna alert data to generate engineered antenna alert data.

3. The method of claim 2, wherein performing the one or more data engineering techniques on the antenna alert data comprises one or more of:
   performing a data cleansing technique on the antenna alert data to generate the engineered antenna alert data;
   performing a feature engineering technique on the antenna alert data to generate the engineered antenna alert data; or
   performing a scaling technique on the antenna alert data to generate the engineered antenna alert data.

4. The method of claim 1, further comprising:
   storing one or more of the correlation heatmap matrix, the change point metrics, or the scores in a data structure associated with the device.

5. The method of claim 1, wherein the correlation heatmap matrix correlates key performance indicators with health and performance alerts in a particular time period.

6. The method of claim 1, wherein the correlation model is a Pearson correlation model.

7. The method of claim 1, wherein processing the antenna alert data, with the correlation model, to generate the correlation heatmap matrix comprises:
   correlating key performance indicators with the antenna alert data in a time period to generate the correlation heatmap matrix.

8. A device, comprising:
   one or more processors configured to:
      receive antenna alert data associated with health and performance of antennas of a plurality of base stations of a network;
      perform one or more data engineering techniques on the antenna alert data;
      process the antenna alert data, with a correlation model and after performing the one or more data engineering techniques on the antenna alert data, to generate a correlation heatmap matrix;
      utilize a change point detection model to process the antenna alert data, associated with the correlation heatmap matrix, to determine change point metrics;
      calculate scores for the antenna alert data associated with the correlation heatmap matrix and the change point metrics; and
      perform one or more corrective actions based on the scores.

9. The device of claim 8, wherein the change point metrics identify, in the antenna alert data, data that changes and remains unchanged.

10. The device of claim 8, wherein the scores are standard scores that indicate a quantity of standard deviations that data points lie above or below a mean value.

11. The device of claim 8, wherein the one or more processors, to perform the one or more corrective actions, are configured to on one or more of:
    cause a technician to be dispatched to service one of the antennas of one of the plurality of base stations; or
    cause an autonomous vehicle to be dispatched to service one of the antennas of one of the plurality of base stations.

12. The device of claim 8, wherein the one or more processors, to perform the one or more corrective actions, are configured to:
    identify one of the plurality of base stations associated with an antenna experiencing a problem based on the scores,
    determine one or more parameters, associated with the one of the plurality of base stations, to modify in order to correct the problem with the antenna; and
    instruct the one of the plurality of base stations to modify the one or more parameters to correct the problem with the antenna.

13. The device of claim 8, wherein the one or more processors, to perform the one or more corrective actions, are configured to one or more of:
- cause a repair to be scheduled for one of the antennas of one of the plurality of base stations based on the scores; or
- cause a part to be ordered for one of the plurality of base stations associated with one of the antennas based on the scores.

14. The device of claim 8, wherein the one or more processors, to perform the one or more corrective actions, are configured to:
- determine a suggestion to modify one or more parameters for one of the plurality of base stations associated with one of the antennas, based on the scores; and
- provide the suggestion for display.

15. A non-transitory computer-readable medium storing a set of instructions, the set of instructions comprising:
- one or more instructions that, when executed by one or more processors of a device, cause the device to:
  - receive antenna alert data associated with health and performance of antennas of a plurality of base stations of a network;
  - perform one or more data engineering techniques on the antenna alert data to generate engineered antenna alert data;
  - process the engineered antenna alert data, with a correlation model, to generate a correlation heatmap matrix;
  - utilize a change point detection model to process the engineered antenna alert data, associated with the correlation heatmap matrix, to determine change point metrics;
  - calculate scores for the engineered antenna alert data associated with the correlation heatmap matrix and the change point metrics; and
  - perform one or more corrective actions based on the scores.

16. The non-transitory computer-readable medium of claim 15, wherein the one or more instructions, that cause the device to perform the one or more data engineering techniques on the antenna alert data, cause the device to:
- perform a data cleansing technique on the antenna alert data to generate the engineered antenna alert data;
- perform a feature engineering technique on the antenna alert data to generate the engineered antenna alert data; or
- perform scaling technique on the antenna alert data to generate the engineered antenna alert data.

17. The non-transitory computer-readable medium of claim 15, wherein the one or more instructions, that cause the device to process the engineered antenna alert data, with the correlation model, to generate the correlation heatmap matrix, cause the device to:
- correlate key performance indicators with the engineered antenna alert data in a time period to generate the correlation heatmap matrix.

18. The non-transitory computer-readable medium of claim 15, wherein the change point metrics identify, in the engineered antenna alert data, data that changes and remains unchanged.

19. The non-transitory computer-readable medium of claim 15, wherein the scores are standard scores that indicate a quantity of standard deviations that data points lie above or below a mean value.

20. The non-transitory computer-readable medium of claim 15, wherein the one or more instructions, that cause the device to perform the one or more corrective actions, cause the device to on one or more of:
- cause a technician to be dispatched to service one of the antennas of one of the plurality of base stations;
- cause an autonomous vehicle to be dispatched to service one of the antennas of one of the plurality of base stations;
- cause a repair to be scheduled for one of the antennas of one of the plurality of base stations based on the scores; or
- cause a part to be ordered for one of the plurality of base stations associated with one of the antennas based on the scores.

* * * * *